United States Patent [19]
Van Amstel

[11] Patent Number: 5,229,619
[45] Date of Patent: Jul. 20, 1993

[54] APPARATUS FOR OPTICALLY MEASURING THE HEIGHT OF SURFACE IRREGULARITIES HAVING AN IMAGED SCANNING SPOT FORMED ON A RADIATION DIFFUSIVE SCREEN

[75] Inventor: Willem D. Van Amstel, Eindhoven, Netherlands

[73] Assignee: U.S. Philips Corporation, New York, N.Y.

[21] Appl. No.: 814,978

[22] Filed: Dec. 23, 1991

[30] Foreign Application Priority Data

Dec. 27, 1990 [NL] Netherlands ............... 9002869

[51] Int. Cl.⁵ ............................................. G01N 21/86
[52] U.S. Cl. .................................... 250/560; 356/376
[58] Field of Search .................. 280/560, 561, 201.6; 356/1, 4, 376, 381; 359/599, 893, 855, 837

[56] References Cited

U.S. PATENT DOCUMENTS

| | | | |
|---|---|---|---|
| 2,706,262 | 4/1955 | Barnes | 359/599 |
| 4,748,329 | 5/1988 | Cielo et al. | 250/560 |
| 4,782,239 | 11/1988 | Hirose et al. | 356/4 |
| 4,982,103 | 1/1991 | Meiffren et al. | 250/560 |
| 5,024,529 | 6/1991 | Svetroff et al. | 356/1 |
| 5,076,693 | 12/1991 | Teramoto | 356/376 |

Primary Examiner—David C. Nelms
Assistant Examiner—Que T. Le
Attorney, Agent, or Firm—Leroy Eason

[57] ABSTRACT

A device for optically measuring the height of surface irregularities of an object. A scanning spot of radiation (11) is formed on such surface, and a first optical imaging system (20) forms a reflected image (31) of the scanning spot on a diffusely reflective or transmissive screen (30). A second imaging system (40) forms from the imaged scanning spot (31) a re-imaged scanning spot (51) on the photosensitive surface of a position-sensitive radiation detection system (50). The screen is arranged so that the radiation from scanning spot (11) is incident thereon at a small grazing angle, and is adapted to diffuse the radiation from the imaged scanning spot (31) to produce radiation directed substantially normally on the photosensitive surface of the radiation detection system. A high degree of correlation between the position of the re-imaged scanning spot (51) on the photosensitive surface and the height ($\Delta Z$) of the surface of the object being measured is thereby achieved. The substantially normal direction of incidence of radiation on the photosensitive surface minimizes reflection therefrom and so improves the efficiency of the radiation detection system.

10 Claims, 3 Drawing Sheets

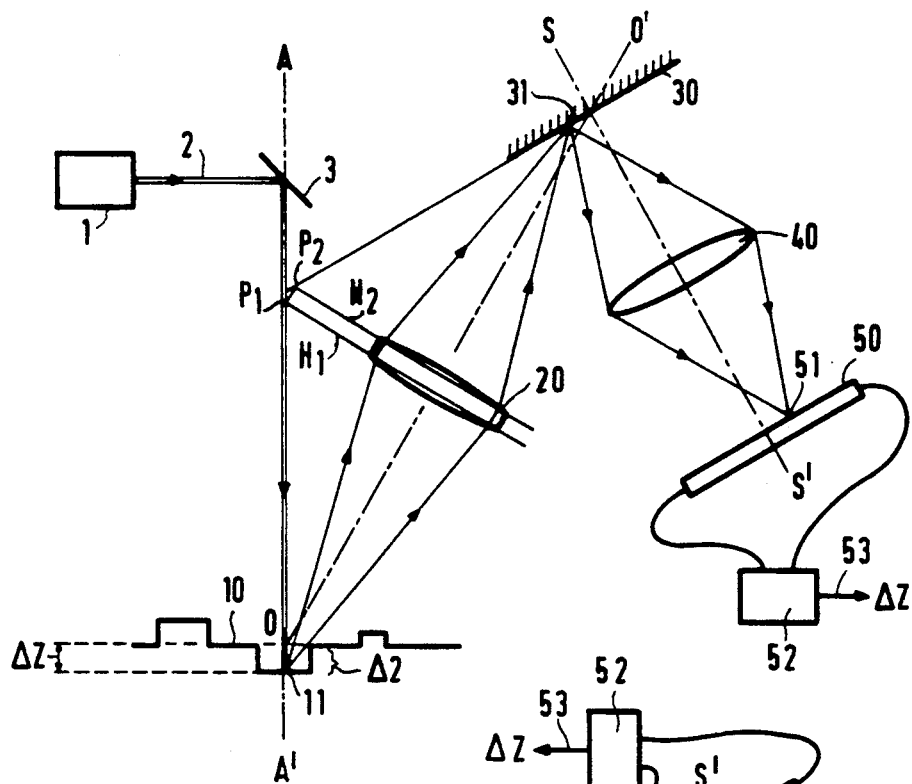
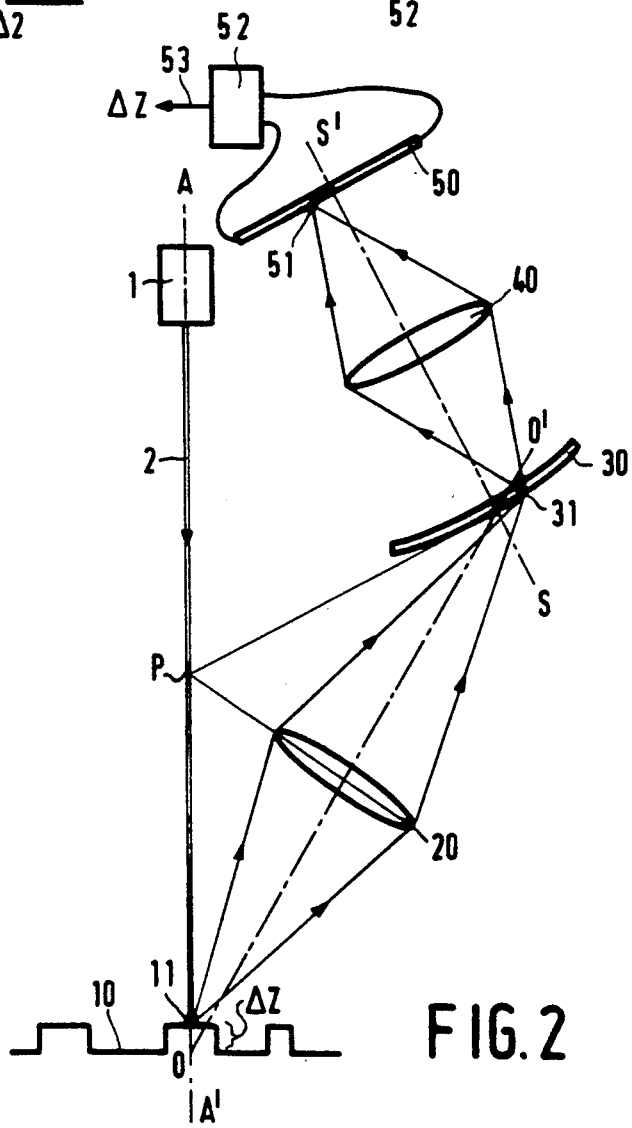
FIG.1
FIG.2

APPARATUS FOR OPTICALLY MEASURING THE HEIGHT OF SURFACE IRREGULARITIES HAVING AN IMAGED SCANNING SPOT FORMED ON A RADIATION DIFFUSIVE SCREEN

BACKGROUND OF THE INVENTION

The invention relates to a device for optically measuring the height of a surface irregularities of an object along an axis substantially normal to such surface, which device comprises a radiation source for generating a radiation beam, means for forming the beam into a radiation spot on the surface of the object, an imaging system for forming a reflected or transmitted image of the scanning spot in a plane, and a radiation detection system for determining the position of the imaged spot in said plane.

A device of this type is used, for example, to check by means of triangulation whether a surface has the desired profile, for example, whether a flat plate is really flat and does not have any grooves or projections. The device may also be used to check whether holes and elevations are provided at the correct positions on a substrate plate, and the device may be further used, for example, for inspecting electronic circuits comprising electrically insulating plates provided with conducting metal strips and electronic components.

A device as described in the opening paragraph is known, inter alia, from published application EP-A 0,134,597. This document describes a device for performing a triangulation so as to determine the distance between the surface of an object and a reference level. The known device comprises a radiation source from which a narrow radiation beam is incident on the surface where it forms a radiation spot. The reflected image of the radiation spot is focused on a linear radiation-sensitive detector surface by means of one or more objective lenses. The position at which the imaged radiation spot is located on the detector surface corresponds to where the radiation beam the impinged upon the object surface and hence indicates the height of the latter surface. A displacement of the position of the radiation spot across the detector surface thereby enables changes in height of the surface of the object to be measured.

The sensitivity of the height measurement, i.e. the ratio between the change of the surface height and the displacement of the position of the incident radiation spot across the detector surface is, inter alia, dependent on the degree of tilt of the surface of the position-sensitive radiation detection system with respect to the incident radiation beam or the optical axis of the imaging system. However, if a small angel is chosen in order to obtain a maximum sensitivity, with the radiation grazing the detector surface, a very large part of the radiation will be reflected by the detector surface and only a small fraction can be measured. Utilization of the tilt of the detector surface to enhance the sensitivity of the height measurement is thus restricted.

SUMMARY OF THE INVENTION

It is one of the objects of the invention to overcome this restriction. To this end a device according to the invention comprise a radiation source unit for generating a radiation beam and for forming a radiation spot on the surface, and also a screen and a first optical imaging system for forming an image of the scanning spot on the screen, the position of the image on the screen being a measure of the height of the surface, a second optical imaging system and a position-sensitive radiation detection system having a radiation-sensitive surface which is conjugated with said screen via the second optical imaging system for re-imaging said image on the radiation-sensitive surface. By forming the screen in such a way that it reflects a considerable fraction of the grazing radiation towards the second imaging system, preferably approximately perpendicular to the surface of the screen, a great sensitivity to height changes is achieved, while nevertheless the radiation is substantially perpendicularly incident on the radiation-sensitive surface of the position-sensitive radiation detection system. To further adapt the sensitivity to the width of the radiation detection, the second imaging system may image the screen in an enlarged, or possibly diminished form on the detector surface.

The device according to the invention preferably has a planar screen, and the plane in which the screen is arranged and a second main plane of the first optical imaging system intersect each other at a point which substantially coincides with the conjugate of the point of intersection of said axis of the device and a first main plane of the first optical imaging system. Due to this measure the first imaging system and the screen comply with the so-called Scheimpflug condition so that in a first order the radiation spot on the surface of the object is imaged in focus on the screen, irrespective of the height of the surface. When a thin lens is used, said conjugated points substantially coincide.

Particularly in a device in which the Scheimpflug condition is satisfied the use of a screen is a great advantage. To enable satisfactory measurement of a steep change of height on the surface, the optical axis of the first imaging system should only extend at a small angle to the direction of the radiation beam incident on the surface, i.e. the axis along which the height of the surface is determined. This should be done to minimize the effect of shadows on the surface. Hence, the main planes of the lens are substantially perpendicular to said axis and the point of intersection is located close to the lens. To achieve a sufficient sensitivity of the height measurement in these circumstances, the plane in which the images of the radiation spot on the surface are focused at different heights of this surface should extend at a rather acute angel to the optical axis of the first imaging system and the radiation is incident at a small angle, grazing this plane.

It is to be noted that an optical measuring system in accordance with the triangulation principle satisfying the Scheimpflug condition is known per se from said EP-A 0,134,597. However, it is not known from this document to position the position-sensitive radiation detector so as to enhance the sensitivity to height changes, or to use a screen for obviating the drawbacks of the Scheimpflug condition in the case of a small triangulation angle.

In a further embodiment of the device according to the invention the screen has a curved surface. The screen is, for example, curved in accordance with an approximated line or the exact line at which the focused images of the radiation spot are formed on the surface.

In one embodiment of the device according to the invention the angle of said surface height measurement axis with respect to the optical axis of the first imaging system is larger than the angle of the lather axis with respect to the plane of the screen. Under this condition a change of the surface height results in a displacement of the image on the screen, by an amount which is larger than the change of height multiplied by the lateral magnification (or diminution) of the first imaging system.

In one embodiment of the device according to the invention the first and second optical imaging systems are arranged at the same side of the screen, which side has a diffusely reflecting or luminescing surface layer. The diffusely reflecting surface layer scatters the incident radiation substantially independently of the angle of the incident radiation with respect to the screen, so that also in the case of a tilted screen a re-image of sufficient light intensity is formed on the position-sensitive radiation detection system via the second imaging system. The surface of the screen may be coated with a white diffusely reflecting material such as $BaSO_4$, or it may have a luminescent coating.

In another embodiment of the device according to the invention the first and second optical imaging systems are still arranged at the same side of the screen but the screen has a reflecting structure comprising a large number of linear elements which extend parallel in a direction which is substantially transverse to the plane subtended by the optical axes of the first and second optical imaging systems. Such elements are arranged in such a way that the reflection of radiation in the plane of the two optical axes is influenced. This may be realised, for example, by means of a fine one-dimensional roughening of narrow scratches or by means of a grating whose grating lines are perpendicular to said plane. Such a grating may comprise a large number of reflecting facets whose surfaces extend at an angle to the plane of the screen.

The screen may also be provided with elements having internally reflecting planes. Such a screen has a reflecting layer of, for example, transparent fibers or prisms in which not only reflection occurs at the front side but also refraction of radiation in the screen material, followed by internal reflection.

In a further embodiment of the device according to the invention the first and second optical imaging systems are arranged at opposite sides of the screen, the screen being a transmission screen. A transmission screen is composed of, for example, a transparent material such as glass or polymethyl methacrylate, and has reflecting facets, a transmission grating or a hologram. The use of a transmission screen enables the height measuring device to have a more compact structure. When a curved screen whose convex side faces the first imaging system is used, a transmission screen can be more easily imaged on a flat position-sensitive radiation detection system.

The invention also relates to a scanning optical height meter comprising a radiation source unit for generating a radiation beam and for forming a scanning spot on a surface of an object to be scanned, and means for displacing the scanning spot and the object relative to each other, the scanning optical height meter further comprising a device as described hereinbefore for measuring the height of the object at any position to be scanned.

The invention particularly relates to such a height meter which comprises a deflection system for displacing the scanning spot along a line on the surface of the object, and a further optical system for forming a spatial image of a portion of the surface around the scanning spot, said portion being selected via the deflection system. The device for measuring the height of the surface then comprises a first imaging system which is not directed towards the surface to be actually measured but to its image which is formed by the further optical system. The surface is scanned in that the deflection system each time selects a different surface part of which an image is formed. A scanning device with which such an image can be obtained is described, for example, in the non-prepublished NL-A 9000100 which corresponds to U.S. Pat. application Ser. No. 642,249 filed Oct. 16, 1991 to which reference is made for further details.

BRIEF DESCRIPTION OF THE DRAWINGS

These and other more detailed aspects of the invention will be described in greater detail with reference to the accompanying drawings.

In the drawings

FIG. 1 shows an embodiment of a device according to the invention;

FIG. 2 shows another embodiment of a device according to the invention;

DETAILED DESCRIPTION OF THE PREFERRED EMBODIMENTS

Figure 3A:
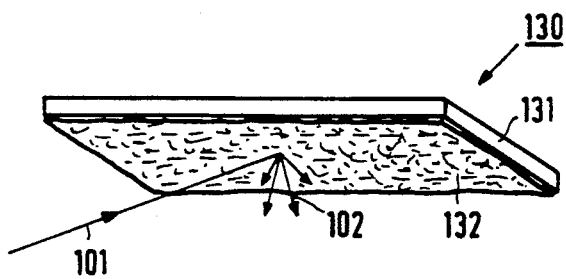
FIG. 3a, 3b and 3c show screens for use in a device according to the invention, having externally reflecting surfaces.

FIG. 1 shows a first embodiment of a device according to the invention. A radiation source unit 1, for example, a laser generates a narrow radiation beam which, for example, via a mirror 3, is approximately perpendicularly incident on a surface 10 where it forms a radiation spot 11. The direction along which the radiation beam 2 is incident on the surface 10 defines the axis A—A' along which the height of the surface 10 is measured. The surface 10 has a plurality of projections and indentations whose height $\Delta Z$ is measured with respect to a reference point 0.

The radiation spot 11 on the surface 10 is reflected to form an imaged spot 31 on a screen 30 by means of the first imaging system 20. In its turn the spot on screen 30 is reflected and re-imaged on a position-sensitive radiation detection system 50 via a second imaging system 40. Since the screen 30 is formed in such a way that a considerable part of radiation incident on the screen at a small grazing angle is diffused and reflected approximately perpendicularly to the screen surface, the image formed on the radiation detection system 50 has a sufficient light intensity to define the position of the re-image 51 of spot 31 on the radiation detection system 50 and hence the position of the spot 31 on the screen 30. The position of the spot 31 is directly coupled to the position of the radiation spot 11 on the surface 10. Since the spatial position of the radiation spot 11 is located on the axis A—A', the position of the spot 31 on the screen 30 and it re-image 51 on the detection system 50 unambiguously define the height of the surface 10 where it intersects the axis A—A'. A displacement over a distance $\Delta Z$ of the surface entails a corresponding displacement of the position of the spot 31 across the screen and hence of the spot 51. The position of the spot 51 is determined in the processing unit 52 from the output signals of the position-sensitive radiation detection system and is converted into a height signal which is available at an output 53 of the processing unit.

FIG. 1 shows the first and second imaging systems as single lenses. These may of course also be composite lenses. The magnification factor of the imaging system is one to one in the Figure. A different magnification factor provides the possibility of obtaining a larger measuring range or a greater sensitivity.

The screen 30 is preferably arranged in such a way that the plane in which the screen is located and the second main plane H2 of the first imaging system 20 intersect each other at a point P2 which is the optical conjugate of the point of intersection P1 of the first main plane H1 and the axis A—A'. When a thin lens is used as a first imaging system, the main planes substantially coincide and so do the points P1 and P2. This condition, the Scheimpflug condition, named after an Austrian colonel who made this discovery in 1915, means that in the first order all points along the optical axis A—A' are imaged in focus on the screen 30. Irrespective of the height of the surface 10 the radiation spot 11 thus forms a well-defined spot on the screen.

The position-sensitive radiation detection system may comprise a CCD element or a series of photodiodes, but also, for example an extended photodiode with electrodes at both ends whereby the difference between photocurrents in the two electrodes is a measure of the position where radiation impinges upon the radiation-sensitive surface. It is also possible to use, for example, a radiation detection system having a radiation-conducting volume in which the position of the incident radiation is determined from the radiation intensities which are available at the ends of the radiation-conducting volume. Such a position-sensitive radiation detection system is described in the non-prepublished NL-A 9002211 which corresponds to U.S. application Ser. No. 773,384, filed Oct. 7, 1991.

FIG. 2 shows another embodiment of the device, for measuring the height of a surface. Here again a narrow radiation beam 2, generated in a radiation source unit 1, forms a radiation spot 11 on the surface 10 to be measured. This radiation spot is imaged as a spot 31 on a screen 30 via the first imaging system 20. In contrast to the embodiment shown in FIG. 1, the screen 30 is not flat but slightly curved so that for any possible position of the radiation spot 11 an accurately focused image of the radiation spot is produced on the screen. To simplify the Figure, the main planes of the imaging system 20 coincide and intersect the axis A—A' at the single point P.

The screen 30 in this embodiment is not a reflective screen, in which the two imaging system are arranged at the same side of the screen, but a transmission screen. The second imaging system 40 is arranged at the opposite side of the screen 30 than the first imaging system 20, and the radiation traverses the transparent screen. In this arrangement the matching of the curvature of the screen 30 to a flat image field on the detection system 50 can be carried out in a comparatively simple manner by means of the imaging system 40. This embodiment also has a larger free working range because the entire optical system is built up in one direction.

Figure 3B:
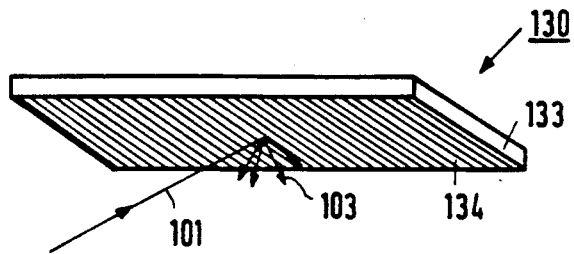
Figure 3C:
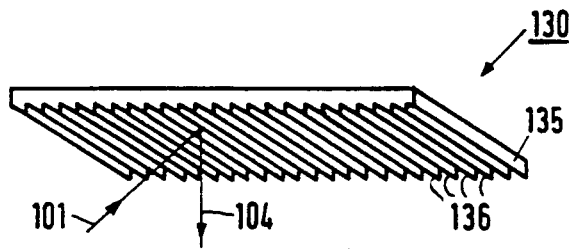

FIG. 3a, 3b and 3c show screens for use in a device according to the invention.

FIG. 3a shows a screen 130 comprising a flat substrate 131 whose surface is provided with a diffusely reflecting material 132. The material should have a high reflection coefficient for the wavelength of the radiation which is generated in the radiated source unit, and may be, for example, white such as $BaSO_4$, or it may have the colour of the radiation used. A radiation beam 101 incident on the surface of the screen is scattered by the diffusely reflecting surface, whereby a considerable part of the scattered radiation 102 leaves the surface approximately in a perpendicular direction. Apart from a passively reflecting material, the surface layer of the screen may also be luminescent. Then a radiation detection system may be used that is sensitive to radiation having a wavelength which is different from that of the radiation generated in the radiation source unit.

FIG. 3b shows a second embodiment of the screen 130. In this embodiment the front side of the substrate 133 has a large number of fine scratches 134 which predominantly extend in a direction perpendicular to the direction of the incident radiation beam 101. This also leads to a scattering of the incident radiation, whereby only a small part of the direction of the scattered radiation 103 is defined by the direction of the incident radiation beam 101. Use may be made of one scratch direction because the incident beam 101 can impinge on different locations on the screen but only exhibits a small variation in direction and is only located in the plane perpendicular to the scratch direction.

The same restriction in the direction of the incident beam is utilized in the screen shown in FIG. 3c. In this embodiment the front side of the substrate 135 has a large number of facets 136 which are oriented in such a way that the incident radiation beam 101 is reflected, as beam 104 towards the second imaging system. Since the radiation spot on the surface to be measured is imaged in focus on the screen, the front side of the screen may have a specularly reflecting layer of, for example, aluminum.

The same directional effect is obtained by providing the front side with a grating so that due to interference a considerable part of the radiation is reflected towards the second imaging system. The grating may be flat but is preferably blazed.

Figure 4A:
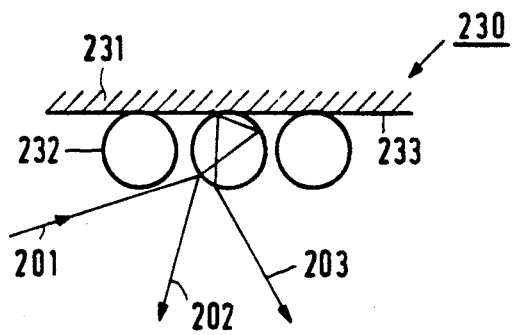
FIG. 4a and 4b show screens having internally reflecting surfaces.
Figure 4B:
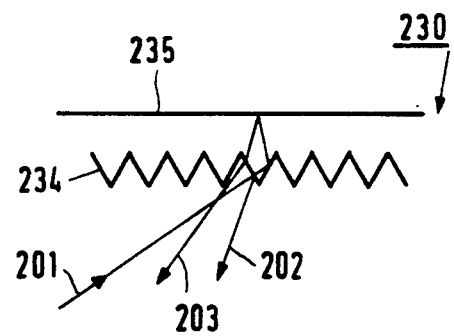

FIGS. 4a and 4b show two screens having internally reflecting planes. In the screen of FIG. 4a a large number of optical fibers 232 is arranged in parallel on the substrate 231. A radiation beam 201 which is incident on the screen is partly reflected directly, as is shown by means of the ray 202. A part of the incident radiation enters the transparent fiber where it is internally reflected several times and leaves the fiber, for example, in a direction 203. Because of the repeated refractions and reflections the direction of the radiation coming from the screen is substantially independent of the direction of incidence of the beam 201. To increase the reflection, the surface 233 of the substrate 231 preferably has a reflecting layer so that radiation coming from the fibers is not absorbed in the substrate 231.

FIG. 4b shows another embodiment of a screen having internally reflecting planes. The screen 230 comprises a plate of transparent material whose front side has ridges 234 of a triangular cross-section. An incident radiation beam 201 is partly reflected on the facets of the ridges and partly refracted in the material. This radiation is reflected several times at the inside of the facets and at the rear side of the plate and emerges again via the front side. The rear side 235 of the plate preferably has a reflecting layer.

Figure 5A:
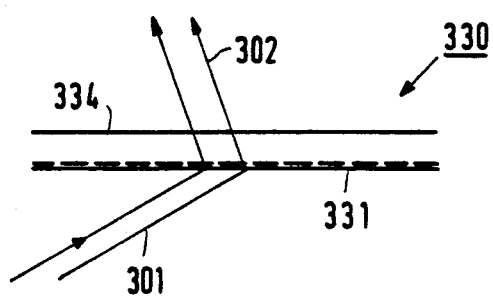
FIGS. 5a and 5b show transmission screens.

The screen of FIG. 5a is a transmission screen comprising a transparent plate 330 whose front side 331 has a transmission grating, for example, a phase or amplitude grating. This grating causes an incident radiation beam 301 to emerge predominently in the direction 302 towards the second imaging system. The front side is preferably also provided with an anti-reflection coating. The rear side 334 may have roughened surface so as to spread the outgoing radiation to some extent.

Figure 5B:
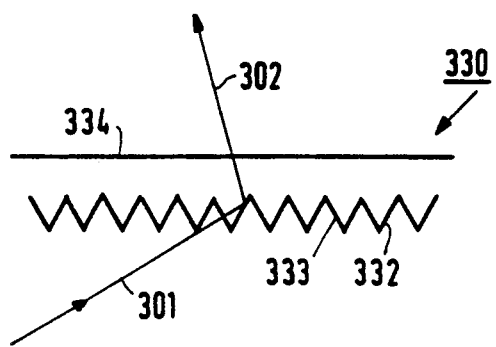

The transmission screen, which is shown in FIG. 5b, also comprises a transparent plate. The front side has ridges of a triangular cross-section whose first facets 333 are directed in such a way that they are substantially perpendicular to the direction of the incident radiation beam 301. As a result, minimal refraction and reflection occur at these facets. The second facets 332 are directed to reflect the incident beam 301 towards the second imaging system. The beam 301 is reflected thereon, for example, by total internal reflection and emerges as beam 302. The rear side 334 of the screen may be roughened to spread the beam 302 towards the second imaging system.

Figure 6:
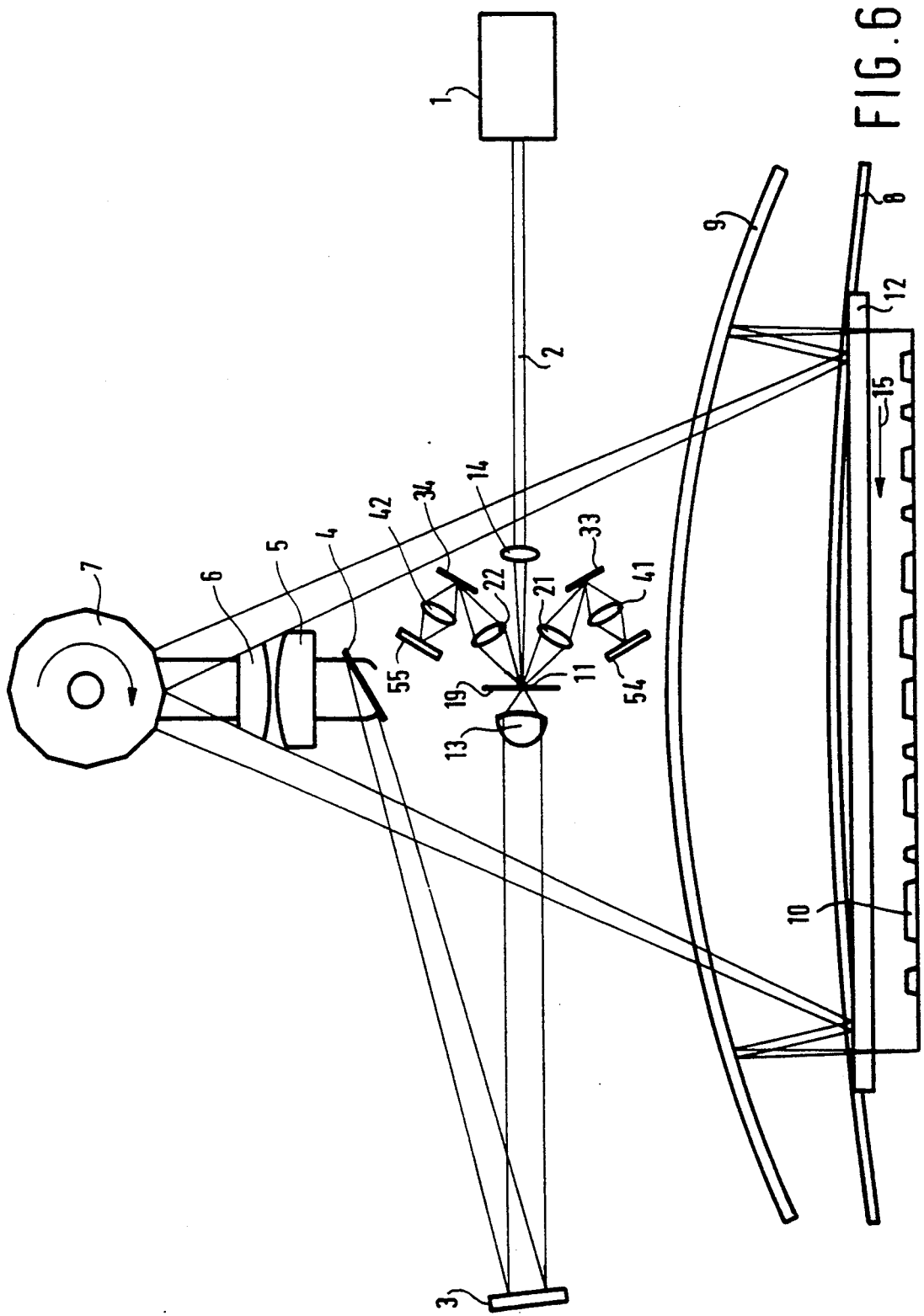
FIG. 6 shows an embodiment of a scanning optical height meter according to the invention.

FIG. 6 shows a scanning optical height meter according to the invention, for example, for scanning PCBs (printed circuit boards).

The radiation source unit comprises a laser 1 which generates a collimated laser beam 2. The laser beam 2 is incident on a lens 14 which focuses the beam in the imaginary plane 19. The laser beam then traverses a cylindrical lens 13, is reflected by the folding mirrors 3 and 4, traverses an imaging lens or imaging system comprising the lenses 5 and 6 and is deflected via a rotating polygon mirror 7 towards the surface 10 to be scanned. Correction mirrors 8 and 9 and a further cylindrical lens 12, which extends throughout the width to be scanned, are arranged between the polygon 7 and the surface 10 to be scanned. Ultimately, the laser beam forms a scanning spot on the surface 10, which scanning spot moves across the surface in the direction of the arrow 15 as a result of the rotation of the polygon mirror 7. The radiation reflected from the surface traverses the optical system in the reverse direction and forms an image 11 on or near the imaginary plane 19. This image is detected by means of a height measuring device as described in the foregoing. The entire surface 10 is scanned by moving the PCB in the direction transverse to the scanning direction.

The height measuring device has a double construction for a more accurate determination and for avoiding shadows. The device comprises two first imaging systems 21 and 22 whose optical axes intersect the imaginary plane 19 at the point where the chief ray of the laser beam 2 passes through this plane. The first imaging systems 21 and 22 form a re-image of the image of the spot 11 on the screens 33 and 34, respectively. The second imaging systems 41 and 42 image the screens 33 and 34 on the position-sensitive radiation detection systems 54 and 55 whose output signals indicate the instantaneous height of the radiation spot 11 and hence the presence or absence of a component on the surface of the PCB.

The cylindrical lenses 12 and 13 provide a numerical aperture which is large enough to form an image of sufficient light intensity of the scanning spot 11 on the detection systems 54 and 55. More details relating to the scanning device and the cylindrical lenses are described int he above-referenced non-prepublished application NL-A 9000100.

I claim:

1. A device for optically measuring the height of the surface of an object at different position thereon, as measured along an axis of the device; said device comprising:
   a radiation source for producing a beam of radiation along said axis which is incident on said surface to form a scanning spot (11) thereon, the incident radiation being at least partially reflected therefrom;
   a first optical imaging system including a radiation diffusive screen, said first imaging system being adapted to direct reflected radiation to said screen to form an image (31) of said scanning spot thereon, the screen being adapted to produce radiation from the imaged scanning spot (31) in a direction substantially normal to the screen, the position of the imaged scanning spot (31) on said screen corresponding to the height of the surface of said object at the position of the scanning spot (11) thereon;
   a radiation detection system having a photosensitive surface (50); and
   a second optical imaging system for receiving the radiation from the imaged scanning spot (31) on said screen and adapted to form therefrom a re-imaged scanning spot (51) on said photosensitive surface, the radiation which forms the re-imaged scanning spot (51) being substantially normal to said photosensitive surface so that the re-imaged scanning spot (51) is optically conjugate to the imaged scanning spot (31) on said screen;
   whereby the position of the re-imaged scanning spot (51) on said photosensitive surface corresponds to the height of the surface of said object at the position of the scanning spot (11).

2. A device as claimed in claim 1 wherein said screen is planar, the plane thereof and a first main plane of the first optical imaging system intersecting each other at a point which substantially coincides with the optical conjugate of the point of intersection of said axis and a second main plane of the first optical imaging system.

3. A device as claimed in claim 1, wherein the screen has a curved surface.

4. A device as claimed in claim 1, wherein the first optical imaging system has an optical axis the angle of which with respect to the axis of said device is larger than the angle of said optical axis with respect to the plane of said screen at the position of the imaged scanning spot (31) thereon.

5. A device as claimed in claim 1, wherein the first and second optical imaging systems are arranged at the same side of the screen, which side has a diffusely reflecting or luminescing surface layer.

6. A device as claimed in claim 1, wherein the first and second optical imaging systems are arranged at the same side of the screen, the second optical imaging system has an optical axis, and the screen has a reflecting structure comprising a large number of linear elements which extend parallel in a direction which is substantially transverse to the plane subtended by the optical axes of the first and second optical imaging systems.

7. A device as claimed in claim 6, wherein said elements have internally reflecting planes.

8. A device as claimed in claim 1, wherein the first and second optical imaging systems are arranged on opposite sides of the screen and the screen is diffusely transmissive; whereby the second optical imaging system forms the re-imaged scanning spot (51) from radiation transmitted through the screen from the imaged scanning spot (31) formed thereon.

9. A device as claimed in claim 1, further comprising means for linearly displacing said scanning spot (11) along the surface of said object so as to effect scanning of said surface.

10. A device as claimed in claim 9, wherein said means for linearly displacing said scanning spot comprises a radiation deflection system, the position of the re-imaged scanning spot (51) on said photosensitive surface corresponding to the height of the surface of said body at a position on said body which is determined by said deflection system.

* * * * *